(12) United States Patent
Ferrer

(10) Patent No.: US 9,806,528 B2
(45) Date of Patent: Oct. 31, 2017

(54) SYSTEMS AND METHODS FOR ESTIMATING NET SOLAR ENERGY PRODUCTION FOR AIRBORNE PHOTOVOLTAIC SYSTEMS

(71) Applicant: The Boeing Company, Seal Beach, CA (US)

(72) Inventor: Alberto Ferrer, Bothell, WA (US)

(73) Assignee: The Boeing Company, Chicago, IL (US)

( * ) Notice: Subject to any disclaimer, the term of this patent is extended or adjusted under 35 U.S.C. 154(b) by 829 days.

(21) Appl. No.: 14/160,905

(22) Filed: Jan. 22, 2014

(65) Prior Publication Data
US 2015/0207327 A1 Jul. 23, 2015

(51) Int. Cl.
| H02J 3/38 | (2006.01) |
| H02J 13/00 | (2006.01) |
| G06Q 50/06 | (2012.01) |
| G06F 17/16 | (2006.01) |
| G01W 1/12 | (2006.01) |
| H02J 3/00 | (2006.01) |

(52) U.S. Cl.
CPC ............. *H02J 3/383* (2013.01); *G06Q 50/06* (2013.01); *H02J 13/00* (2013.01); *H02J 2003/003* (2013.01)

(58) Field of Classification Search
CPC ............. G06F 2217/78; G06F 17/5095; G06F 2217/16; Y04S 10/126; Y02E 10/50; H02J 3/383; G01R 31/2848; B64D 2221/00; G01W 1/12; H04L 41/145; H04L 67/10

USPC ............................ 136/243; 356/218; 703/18
See application file for complete search history.

(56) References Cited

U.S. PATENT DOCUMENTS

| 7,048,204 | B1 | 5/2006 | Addink et al. |
| 7,580,817 | B2 | 8/2009 | Bing |
| 7,832,267 | B2 | 11/2010 | Woro |
| 8,280,799 | B2 | 10/2012 | Bing |

(Continued)

FOREIGN PATENT DOCUMENTS

WO    2013181408 A2    12/2013

OTHER PUBLICATIONS

Klesh et al. "Solar Powered Aircraft: Energy-Optimal Path Planning and Perpetual Endurance", Journal Guidance, Control, and Dynamics, vol. 32, No. 4, Jul.-Aug. 2009, pp. 1320-1329.*

(Continued)

*Primary Examiner* — Omar Fernandez Rivas
*Assistant Examiner* — Shiuh-Huei Ku
(74) *Attorney, Agent, or Firm* — Armstrong Teasdale LLP

(57) ABSTRACT

A method for predicting electrical energy production of a photovoltaic system included in at least one aircraft is described. The method includes determining a first predicted amount of solar irradiance for each of a plurality of geographical points, determining a second predicted amount of solar irradiance received by the at least one aircraft along a flight path of the at least one aircraft, wherein the flight path includes a subset of the plurality of geographical points, and wherein the second predicted amount is based at least in part on the first predicted amount, and determining a predicted amount of electrical energy produced by the photovoltaic system along the flight path, based at least in part on the second predicted amount.

20 Claims, 8 Drawing Sheets

(56) References Cited

U.S. PATENT DOCUMENTS

| | | |
|---|---|---|
| 8,841,592 B1* | 9/2014 | Ho .................... F24J 2/4607 |
| | | 250/203.4 |
| 2009/0279734 A1 | 11/2009 | Brown |
| 2010/0085360 A1 | 4/2010 | Ren et al. |
| 2012/0191351 A1 | 7/2012 | Kerrigan et al. |
| 2013/0018532 A1* | 1/2013 | Segal .................... B64C 39/024 |
| | | 701/3 |
| 2013/0152997 A1 | 6/2013 | Yao et al. |
| 2013/0152998 A1 | 6/2013 | Herzig et al. |
| 2013/0166266 A1 | 6/2013 | Herzig et al. |
| 2013/0226537 A1 | 8/2013 | Jee et al. |
| 2014/0016121 A1 | 1/2014 | MacDonald |

OTHER PUBLICATIONS

Schilllings et al., Operational method for deriving high resolution direct normal irradiance from satellite data, Solar Energy, dated Apr. 1, 2004, pp. 475-484, vol. 76, No. 4.

European Search Report for application No. 15151511.1, dated May 19, 2015, pp. 7.

Guzman et al., Daily Rainfall Probabilities: Conditional upon Prior Occurrence and Amount of Rain, Oct. 1985, American Meteorological Society, Journal of Climate and Applied Meteorology, 1009-1014.

* cited by examiner

SYSTEMS AND METHODS FOR ESTIMATING NET SOLAR ENERGY PRODUCTION FOR AIRBORNE PHOTOVOLTAIC SYSTEMS

BACKGROUND

The present disclosure relates generally to estimating solar energy production for a photovoltaic system and more specifically to estimating net solar energy production for an airborne, or otherwise-moving (e.g., by aircraft, automobile, orbiting satellite, etc.), photovoltaic system.

Given an increasing emphasis on production of electricity from sources other than hydrocarbons, alternative energy production systems such as photovoltaic systems have been developed. Additionally, systems for quantifying and predicting electrical energy production from a photovoltaic system have been developed. However, known systems for quantifying and predicting electrical energy production for a photovoltaic system are focused on stationary and ground-based photovoltaic systems. Accordingly, such known systems are not suitable for estimating or predicting electrical energy production for an airborne photovoltaic system that is travelling at a relatively high rate of speed and at varying altitudes.

BRIEF DESCRIPTION

In one aspect, a method for predicting electrical energy production of a photovoltaic system included in at least one aircraft is described. The method includes determining a first predicted amount of solar irradiance for each of a plurality of geographical points, determining a second predicted amount of solar irradiance received by the at least one aircraft along a flight path of the at least one aircraft, wherein the flight path includes a subset of the plurality of geographical points, and wherein the second predicted amount is based at least in part on the first predicted amount, and determining a predicted amount of electrical energy produced by the photovoltaic system along the flight path, based at least in part on the second predicted amount.

In another aspect, a computing device for predicting electrical energy production of a photovoltaic system included in an aircraft is provided. The computing device is configured to determine a first predicted amount of solar irradiance for each of a plurality of geographical points, determine a second predicted amount of solar irradiance received by the aircraft along a flight path of the aircraft, wherein the flight path includes a subset of the plurality of geographical points, and wherein the second predicted amount is based at least in part on the first predicted amount, and determine a predicted amount of electrical energy produced by the photovoltaic system along the flight path, based at least in part on the second predicted amount.

In another aspect, a computer-readable storage medium is provided. The computer-readable storage medium has computer-executable instructions embodied thereon for predicting electrical energy production of a photovoltaic system included in an aircraft. When executed by a computing device having at least one processor, the computer-executable instructions cause the computing device to determine a first predicted amount of solar irradiance for each of a plurality of geographical points, determine a second predicted amount of solar irradiance received by the aircraft along a flight path of the aircraft, wherein the flight path includes a subset of the plurality of geographical points, and wherein the second predicted amount is based at least in part on the first predicted amount, and determine a predicted amount of electrical energy produced by the photovoltaic system along the flight path, based at least in part on the second predicted amount.

In another aspect, a method for predicting electrical energy production of a photovoltaic system included in at least one vehicle is provided. The method includes determining a first predicted amount of solar irradiance for each of a plurality of geographical points, determining a second predicted amount of solar irradiance received by the at least one vehicle along a path of the at least one vehicle, wherein the path includes a subset of the plurality of geographical points, and wherein the second predicted amount is based at least in part on the first predicted amount, and determining a predicted amount of electrical energy produced by the photovoltaic system along the path, based at least in part on the second predicted amount.

In another aspect, a computing device for predicting electrical energy production of a photovoltaic system included in a vehicle is provided. The computing device is configured to determine a first predicted amount of solar irradiance for each of a plurality of geographical points, determine a second predicted amount of solar irradiance received by the vehicle along a path of the vehicle, wherein the path includes a subset of the plurality of geographical points, and wherein the second predicted amount is based at least in part on the first predicted amount, and determine a predicted amount of electrical energy produced by the photovoltaic system along the path, based at least in part on the second predicted amount.

In another aspect, a computer-readable storage medium having computer-executable instructions embodied thereon for predicting electrical energy production of a photovoltaic system included in a vehicle is provided. When executed by a computing device having at least one processor, the computer-executable instructions cause the computing device to determine a first predicted amount of solar irradiance for each of a plurality of geographical points, determine a second predicted amount of solar irradiance received by the vehicle along a path of the vehicle, wherein the path includes a subset of the plurality of geographical points, and wherein the second predicted amount is based at least in part on the first predicted amount, and determine a predicted amount of electrical energy produced by the photovoltaic system along the path, based at least in part on the second predicted amount.

DETAILED DESCRIPTION

Figure 1:
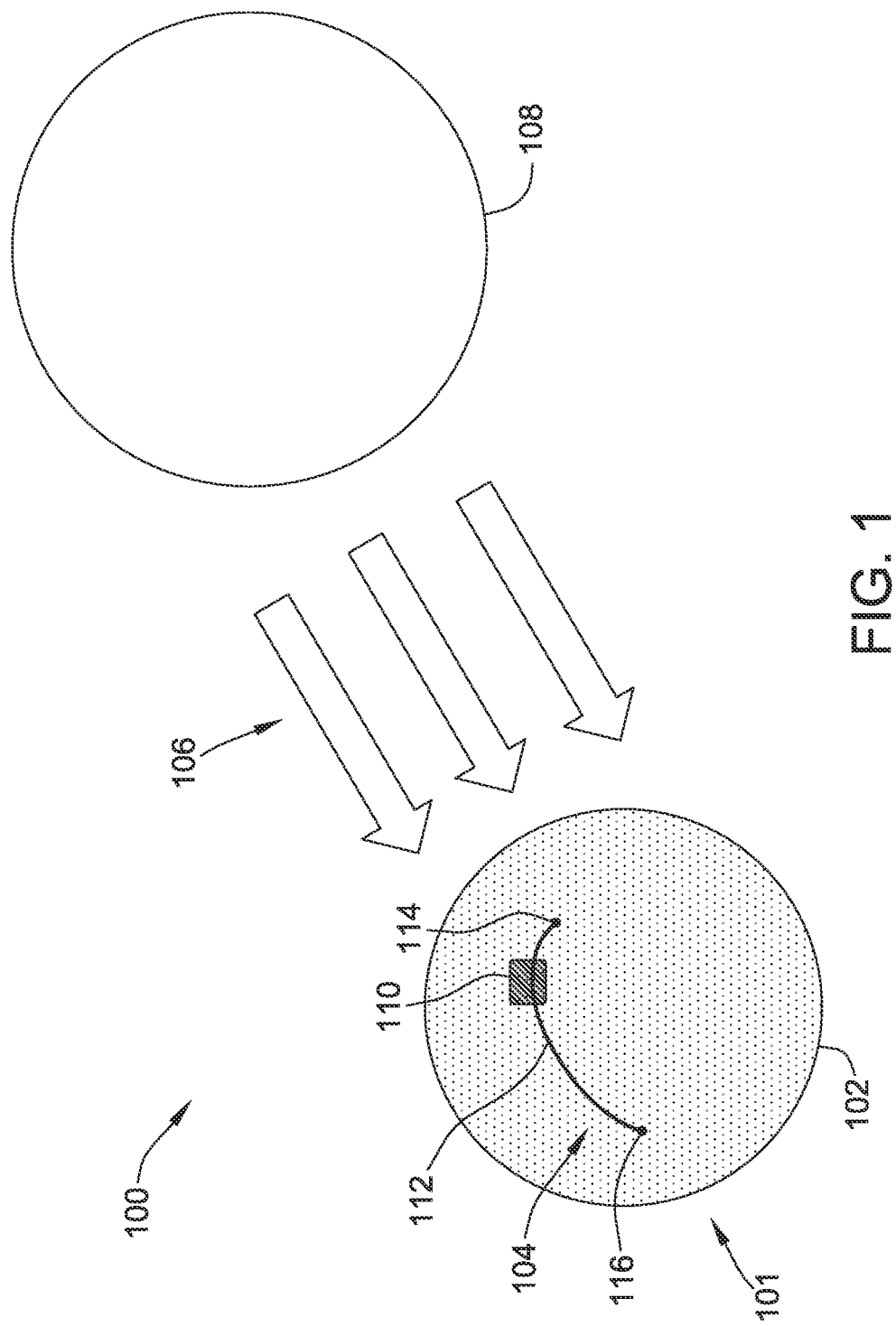
FIG. 1 is a simplified diagram of an example environment in which geographical points along a flight path receive solar irradiance.

FIG. 1 is a simplified diagram of an example environment 100 in which a geographical area 102 having a plurality of geographical points 104 receives solar irradiance 106. Solar irradiance 106 is generated by the Sun 108. Geographical area 102 is all or a portion of a surface or area above the surface of a planet 101 (e.g. Earth). Each of geographical points 104 may receive a different amount of solar irradiance 106 during a given time period, for example a 24-hour period, or during a flight of an aircraft. Factors that may affect an amount of solar irradiance 106 received at a geographical point 104 include the location of geographical point 104 relative to the Sun 108, time of day, time of year, weather conditions, and an altitude of geographical point 104. More specifically, geographical point 104 is not necessarily on the surface of planet 101, but rather may be at a given elevation above the surface. A vehicle 110, for example an aircraft, may traverse a path 112, for example a flight path, between a starting point 114 and an ending point 116. Flight path 112 includes a plurality of geographical points 104. While traversing flight path 112, aircraft 110 receives solar irradiance 106 from Sun 108.

Figure 2:
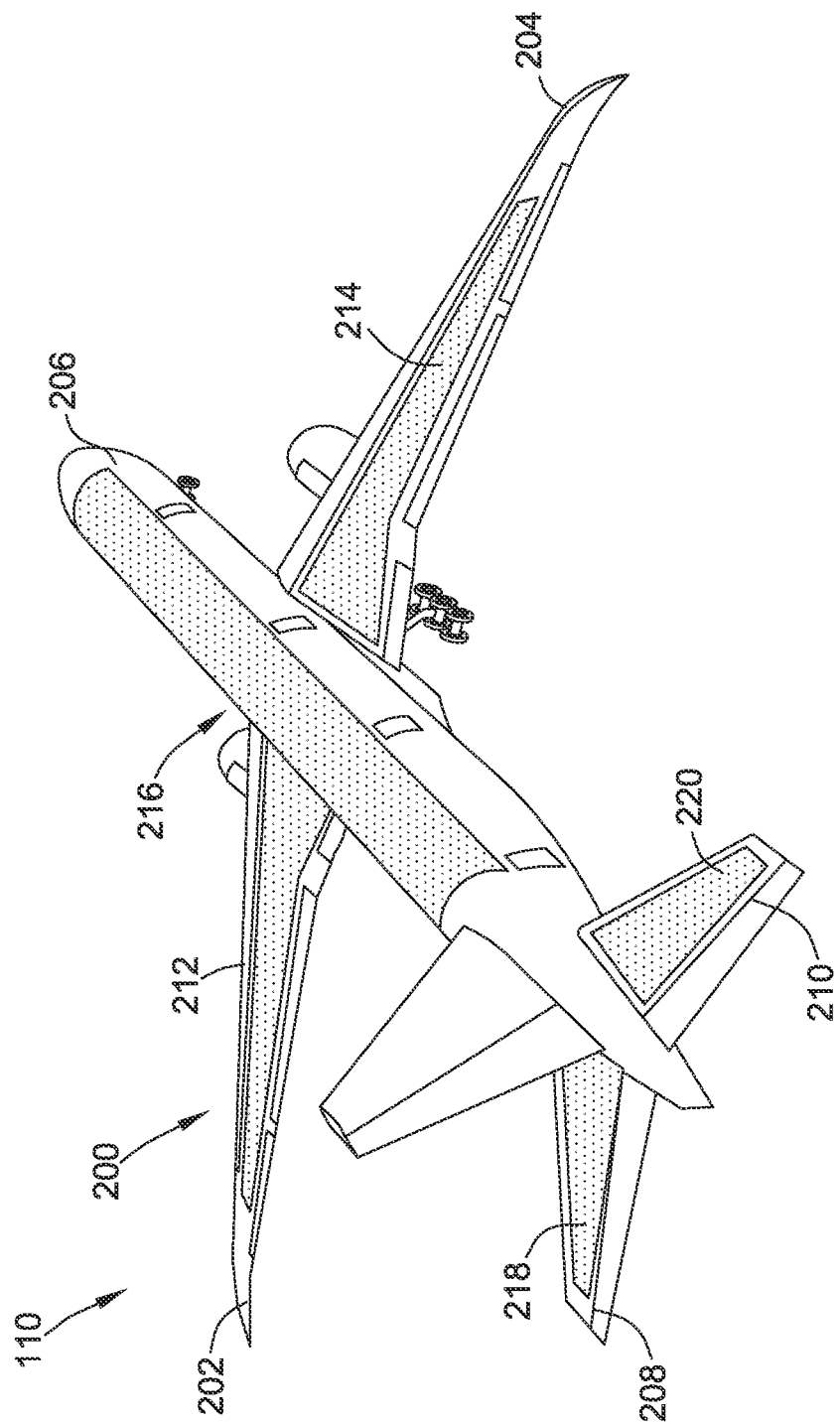
FIG. 2 is a conceptual diagram of an aircraft that includes a photovoltaic system.

FIG. 2 is a conceptual diagram of aircraft 110, which includes a photovoltaic system 200. Photovoltaic system 200 is located on an outer surface of a first wing 202, a second wing 204, a fuselage 206, a first horizontal stabilizer 208, and a second horizontal stabilizer 210 of aircraft 110. In other implementations, photovoltaic system 200 is located in other portions of aircraft 110. Photovoltaic system 200 defines a total surface area, that includes a first surface area 212 associated with first wing 202, a second surface area 214 associated with second wing 204, a third surface area 216 associated with fuselage 206, a fourth surface area 218 associated with first horizontal stabilizer 208, and a fifth surface area 220 associated with second horizontal stabilizer 210. First surface area 212 and second surface area 214 may each be, for example, 73.4 square meters. Third surface area 216 may be, for example, 265 square meters. Fourth surface area 218 and fifth surface area 220 may each be, for example, 17.7 square meters. In other implementations, first surface area 212, second surface area 214, third surface area 216, fourth surface area 218, and/or fifth surface area 220 may be different than the examples given above. As described herein, a computing device 300 (FIG. 3) may store, in a memory, a model of aircraft 110, and more particularly surface angles and surface areas of aircraft 110 and photovoltaic system 200.

Figure 3:
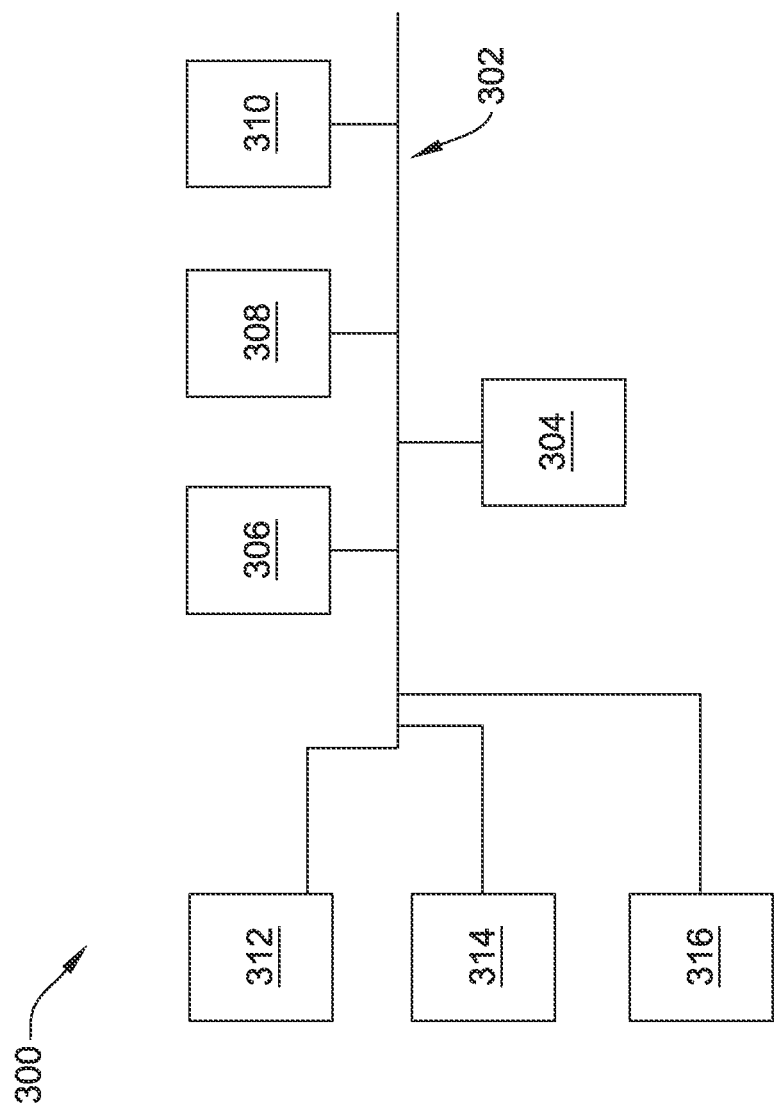
FIG. 3 is a block diagram of an example computing device that may determine a predicted amount of electrical energy produced by the photovoltaic system of the aircraft of FIG. 2, while traveling along the flight path of FIG. 1.

FIG. 3 is a block diagram of an example computing device 300 that may determine a predicted amount of electrical energy produced by photovoltaic system 200 of aircraft 110 while traveling along flight path 112. Computing device 300 may include a bus 302, a processor 304, a main memory 306, a read only memory (ROM) 308, a storage device 310, an input device 312, an output device 314, and a communication interface 316. Bus 302 may include a path that permits communication among the components of computing device 300.

Processor 304 may include any type of conventional processor, microprocessor, or processing logic that interprets and executes instructions. Main memory 306 may include a random access memory (RAM) or another type of dynamic storage device that stores information and instructions for execution by processor 304. ROM 308 may include a conventional ROM device or another type of static storage device that stores static information and instructions for use by processor 304. Storage device 310 may include a magnetic and/or optical recording medium and its corresponding drive. In some implementations, storage device 310 includes a weather database 410 (FIG. 4) described in more detail herein.

Input device 312 may include a conventional mechanism that permits computing device 300 to receive commands, instructions, or other inputs from a user, including visual, audio, touch, button presses, stylus taps, etc. Additionally, input device may receive location information. Accordingly, input device 312 may include, for example, a camera, a microphone, one or more buttons, and/or a touch screen. Output device 314 may include a conventional mechanism that outputs information to a user, including a display (including a touch screen) and/or a speaker. Communication interface 316 may include any transceiver-like mechanism that enables computing device 300 to communicate with other devices and/or systems. For example, communication interface 316 may include mechanisms for communicating with another computing device.

As described herein, computing device 300 facilitates predicting electrical energy production of a photovoltaic system (e.g., photovoltaic system 200) of an aircraft (e.g., aircraft 110) as the aircraft traverses a flight path (e.g., flight path 112). Computing device 300 may perform these and other operations in response to processor 304 executing software instructions contained in a computer-readable medium, such as memory 306. A computer-readable medium may be defined as a physical or logical memory device and/or carrier wave. The software instructions may be read into memory 306 from another computer-readable medium, such as data storage device 310, or from another device via communication interface 316. The software instructions contained in memory 306 may cause processor 304 to perform processes described herein. In other implementations, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 4:
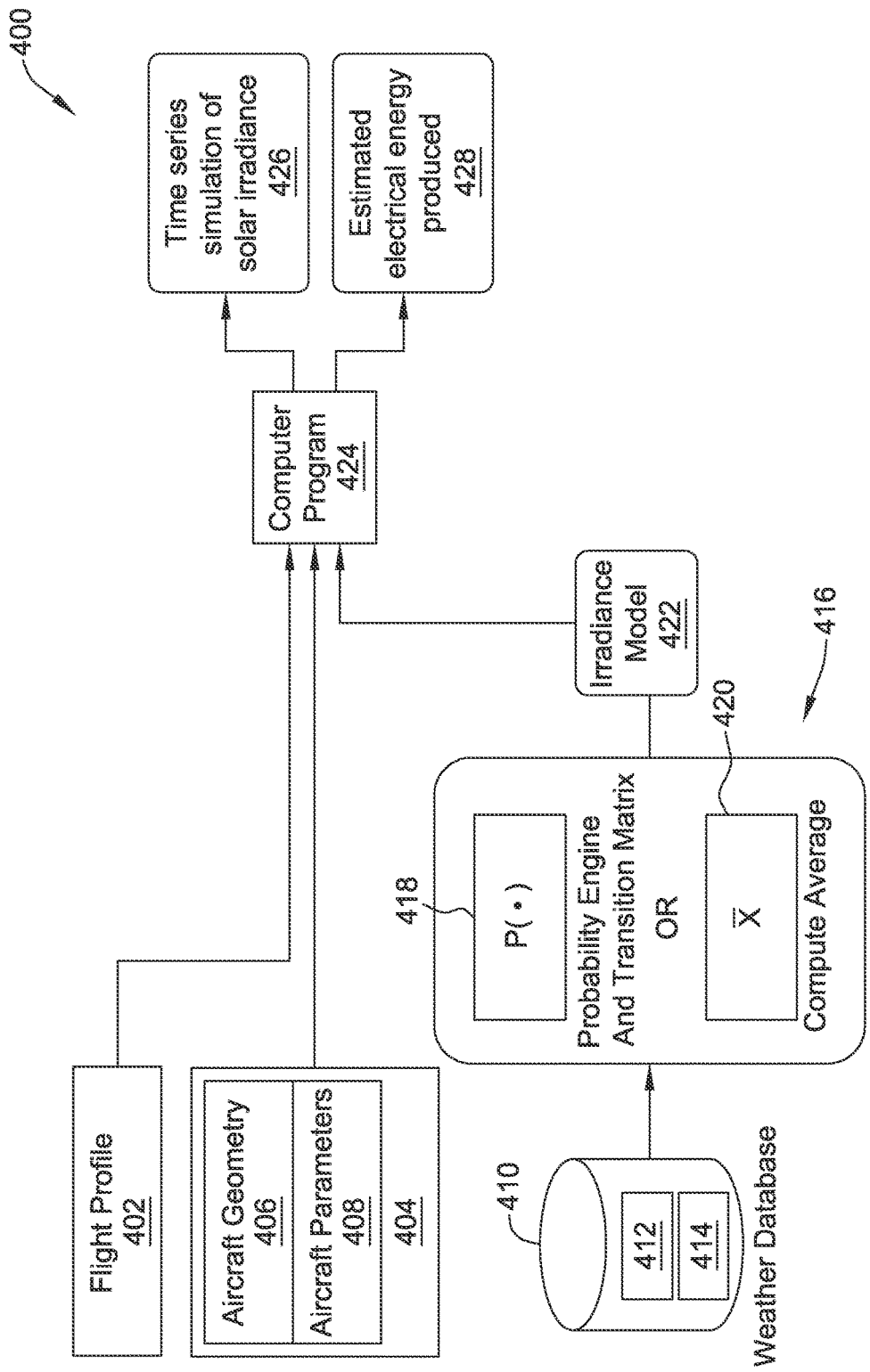
FIG. 4 is a block diagram of an example data flow that may be used for predicting electrical energy production of the photovoltaic system of the aircraft of FIG. 2 as the aircraft traverses the flight path of FIG. 1.

FIG. 4 is a block diagram of an example data flow 400 that may be used for predicting electrical energy production of photovoltaic system 200 as aircraft 110 traverses flight path 112. Computing device 300 receives flight profile parameters 402. Flight profile parameters 402 may include starting coordinates, ending coordinates, a mean taxi time, a mean time at a gate of an airport ("mean gate time"), a takeoff time, and a landing time. Computing device 300 additionally receives a model 404 of aircraft 110. More specifically, computing device 300 receives aircraft geometry 406 and aircraft parameters 408. Aircraft geometry 406 includes, data pertaining to surface angles and to surface areas for first wing 202, second wing 204, fuselage 206, first horizontal stabilizer 208, and second horizontal stabilizer 210. More specifically, aircraft geometry 406 may include first surface area 212, second surface area 214, third surface area 216, fourth surface area 218, and fifth surface area 220. Aircraft parameters 408 include a cruise speed of aircraft 110, a cruise altitude of aircraft 110, and a takeoff speed of aircraft 110. Computing device 300 may calculate flight path 112 of aircraft 110 using flight profile parameters 402. In some implementations, computing device 300 additionally utilizes aircraft parameters 408 in calculating flight path 112. Computing device 300 may receive flight profile parameters 402 and model 404 through input device 312 and/or through communication interface 316, for example from another computing device (not shown) in communication with computing device 300.

Computing device 300 additionally receives weather data from a weather database 410 for geographical points 104 along flight path 112, and in some implementations, for all geographical points 104 of planet 101. Weather database 410 may include historical weather data 412 and/or current weather data 414. In some implementations, historical weather data 412 and current weather data 414 is obtained from one or more global weather stations (not shown). Computing device 300 parses weather data 412 and 414 from weather database 410 to generate a weather and atmosphere attenuation model 416. More specifically, computing device 300 generates weather and atmosphere attenuation model 416 by applying a probability engine and transition matrix 418 (i.e., a probability generating function) to determine a probability or percentage chance of one or more weather events occurring in one or more geographical points 104 along flight path 112, at a particular altitude or range of altitudes, during all or a portion of a predetermined time period starting at the departure time (a "starting time") and ending at an ending time when aircraft 110 is predicted to arrive at ending point 116. The weather events may include rain, clouds, and/or other events that may affect an amount of solar irradiance 106 received at the one or more geographical points 104. In other implementations, computing device 300 generates weather and atmosphere attenuation model 416 by determining an average 420 for weather conditions for the one or more geographical points 104 along flight path 112. For example, for a given day of a month, computing device 300 may retrieve, from weather database 410, weather conditions for each of the one or more geographical points 104 for multiple previous years and calculate an average weather 420 for each geographical point 104. In some implementations, computing device 300 assigns weights to weather data 412 and 414 from weather database 410, such that older weather data is weighted less heavily than more recent weather data, in calculating weather and atmosphere attenuation model 416. In some implementations, rather than making the above calculations only for geographical points 104 along flight path 112, computing device 300 makes the above calculations for all points in geographical area 102, which, in some implementations, may be all geographical points 104 on planet 101.

Additionally, computing device 300 generates or calculates an irradiance model 422 for geographical points 104 included in atmosphere attenuation model 416. More specifically for each geographical point 104, computing device 300 calculates solar parameters including an azimuth, a declination, an hour angle, and a solar time. Additionally, computing device 300 combines the solar parameters with weather and atmosphere attenuation model 416 to determine an amount of solar irradiance 106 received at each geographical point 104. More specifically, by combining weather and atmosphere attenuation model 416 with the solar parameters, computing device 300 determines an amount of solar irradiance received at each geographical point 104 under weather conditions that may attenuate or decrease an amount of solar irradiance 106 that would otherwise be received at each geographical point 104 under clear sky conditions.

Additionally, computing device 300 executes a computer program 424 (i.e., computer-executable instructions) that causes computing device 300 to generate a time series simulation 426 of solar irradiance 106 for geographical points 104 included in weather and atmosphere attenuation model 416 and irradiance model 422. As described herein, in some implementations, time series simulation 426 is an animation. In some implementations, time series simulation 426 may be a time series simulation of global irradiance (i.e., all geographical points 104 of planet 101) rather than only geographical points 104 included within flight path 112. Additionally, computing device 300 determines an estimated amount of electrical energy 428 produced by photovoltaic system 200 while aircraft 110 travels along flight path 112.

Figure 5:
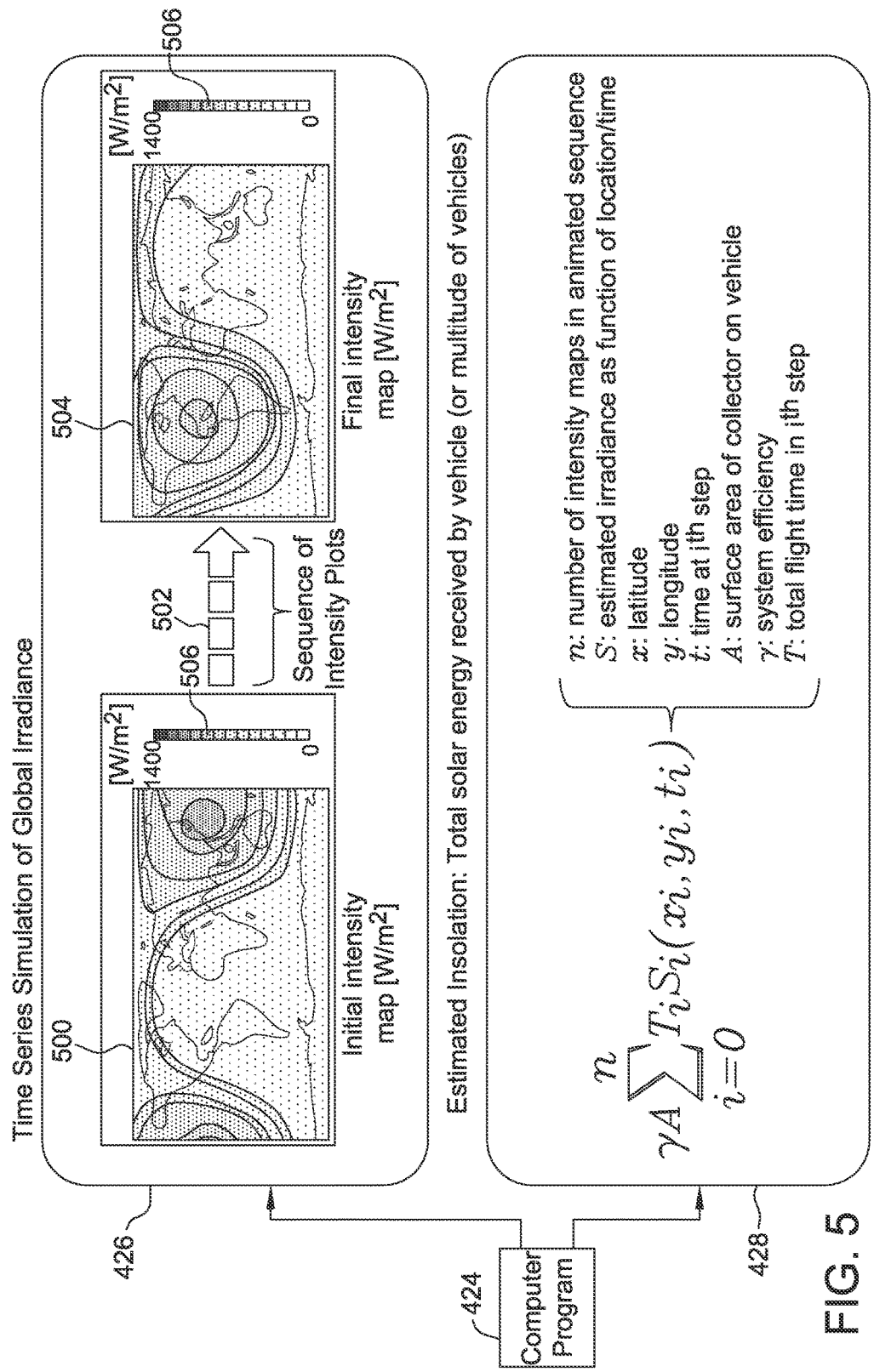
FIG. 5 is a block diagram of example output from the computing device of FIG. 3.

FIG. 5 is a block diagram of example output from computing device 300 based on predicting amounts of solar irradiance 106 received at geographical points 104 over a predetermined time period (i.e., the starting time to the ending time for flight path 112) and for predicting how much electrical energy will be produced by photovoltaic system 200 as aircraft 110 travels along flight path 112. More specifically, and as described above, computing device 300, executing computer program 424, generates time series simulation 426 (e.g., an animation), which includes a plurality of intensity maps 500, 502, and 504. More specifically, computing device 300 generates first intensity map 500, which pertains to the beginning of the predetermined time period (e.g., the starting time). Additionally computing device 300 generates final intensity map 504, which pertains to the end of the predetermined time period (e.g., the ending time). Further, computing device generates at least one intermediate intensity map 502 that pertains to at least one time interval (e.g. an hour, a minute, a second, or other unit of time) between the beginning of the predetermined time period and the end of the predetermined time period. As describe above, in some implementations, computing device 300 causes first intensity map 500, at least one intermediate intensity map 502, and final intensity map 504 to be displayed in a chronological sequence, for example as an animation.

In some implementations, first intensity map 500 may include a graphical representation of geographical area 102 that is coded with colors, shades of gray, patterns, or other indicia that represents an intensity (e.g., Watts per meters squared) of solar irradiance 106 received at geographical points 104 of geographical area 102 at the beginning of the predetermined time period. For example, first intensity map 500 may represent solar intensity over a first hour of the predetermined time period. Additionally, first intensity map 500 may include a legend 506 that identifies levels of intensity represented by the color, shades of gray, patterns, or other indicia. In such implementations, at least one intermediate intensity map 502 and final intensity map 504 include corresponding indicia and legend 506 for respective time intervals within the predetermined time period.

Computing device 300 may estimate the amount of electrical energy 428 produced by photovoltaic system 200 while aircraft 110 traverses flight path 112 using an equation, such as the following equation:

$$\gamma A \Sigma_{i=0}^{n} T_i S_i(x_i, y_i, t_i) \qquad \text{(Equation 1)}$$

In Equation 1, n represents the total number of intensity maps in time series simulation 426, S represents an estimated solar irradiance as a function of location and time, x represents a latitude, y represents a longitude, t represents a time at an $i^{th}$ step, A represents the total surface area of photovoltaic system 200, γ represents a system efficiency (i.e., efficiency of photovoltaic system 200 in converting solar irradiance 106 into electrical energy), and T represents a total flight time at the $i^{th}$ step.

Figure 6:
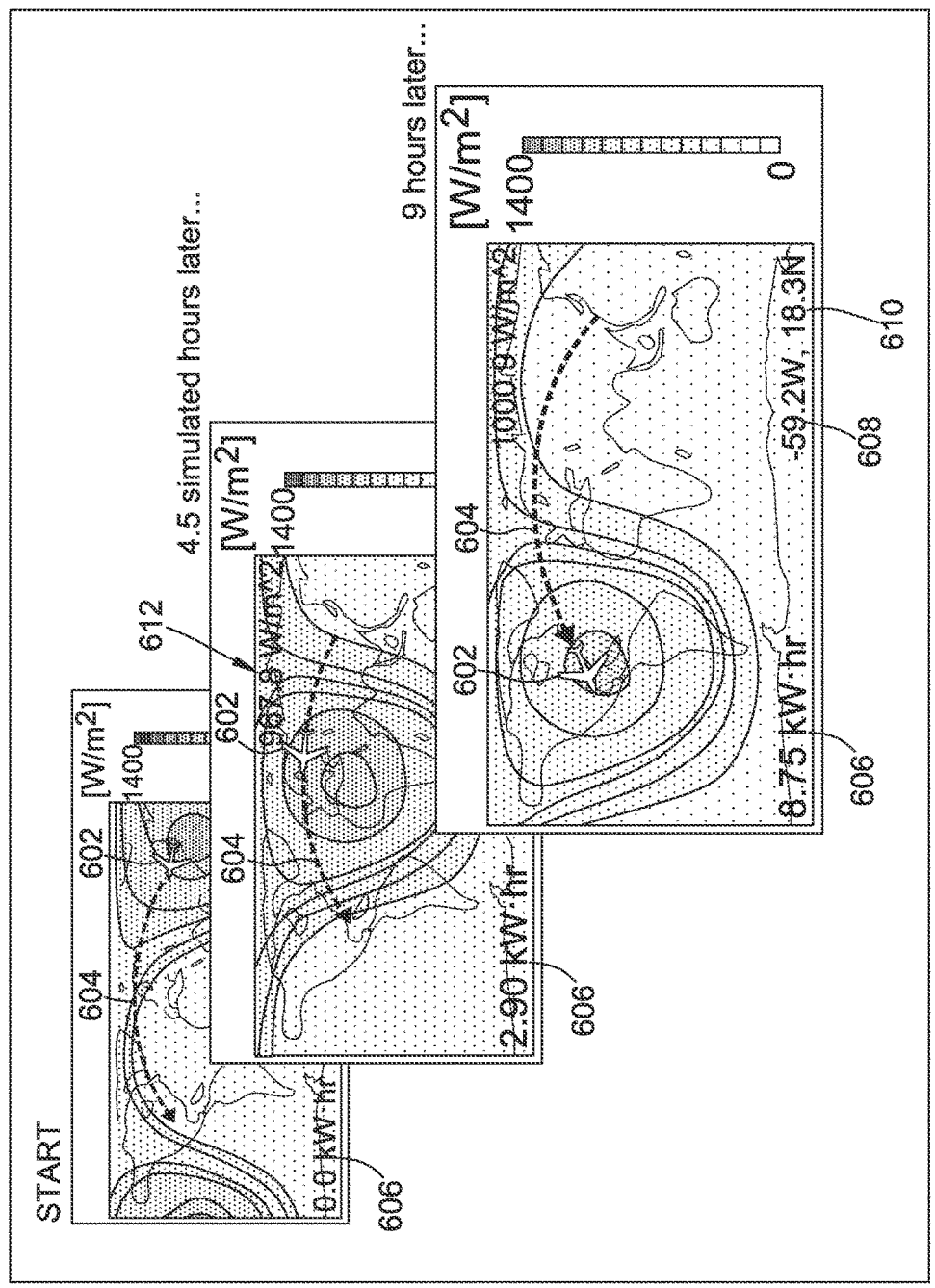
FIG. 6 is a diagram of a time series simulation generated by the computing device of FIG. 3.

FIG. 6 is a diagram of time series simulation 426 generated by computing device 300. Intensity maps 500, 502, and 504 each include a graphical representation 602 of aircraft 110 as it travels along a graphical representation 604 of flight path 112. Additionally, intensity maps 500, 502, and 504 each include a representation 606 of a total amount of electrical energy produced by photovoltaic system 200 at each point in time (i.e., step) that each intensity map 500, 502, and 504 corresponds to. Additionally, intensity maps 500, 502, and 504 each include a representation 608 of the latitude and a representation 610 of the longitude of aircraft 110 at the particular point in time corresponding to the intensity map 500, 502, 504. Additionally, one or more of intensity maps 500, 502, and 504 may display a representation 612 of localized solar irradiance 106 (i.e., solar irradiance 106 received at one or more geographical points 104 where aircraft 110 is predicted to be located along flight path 112).

Figure 7:
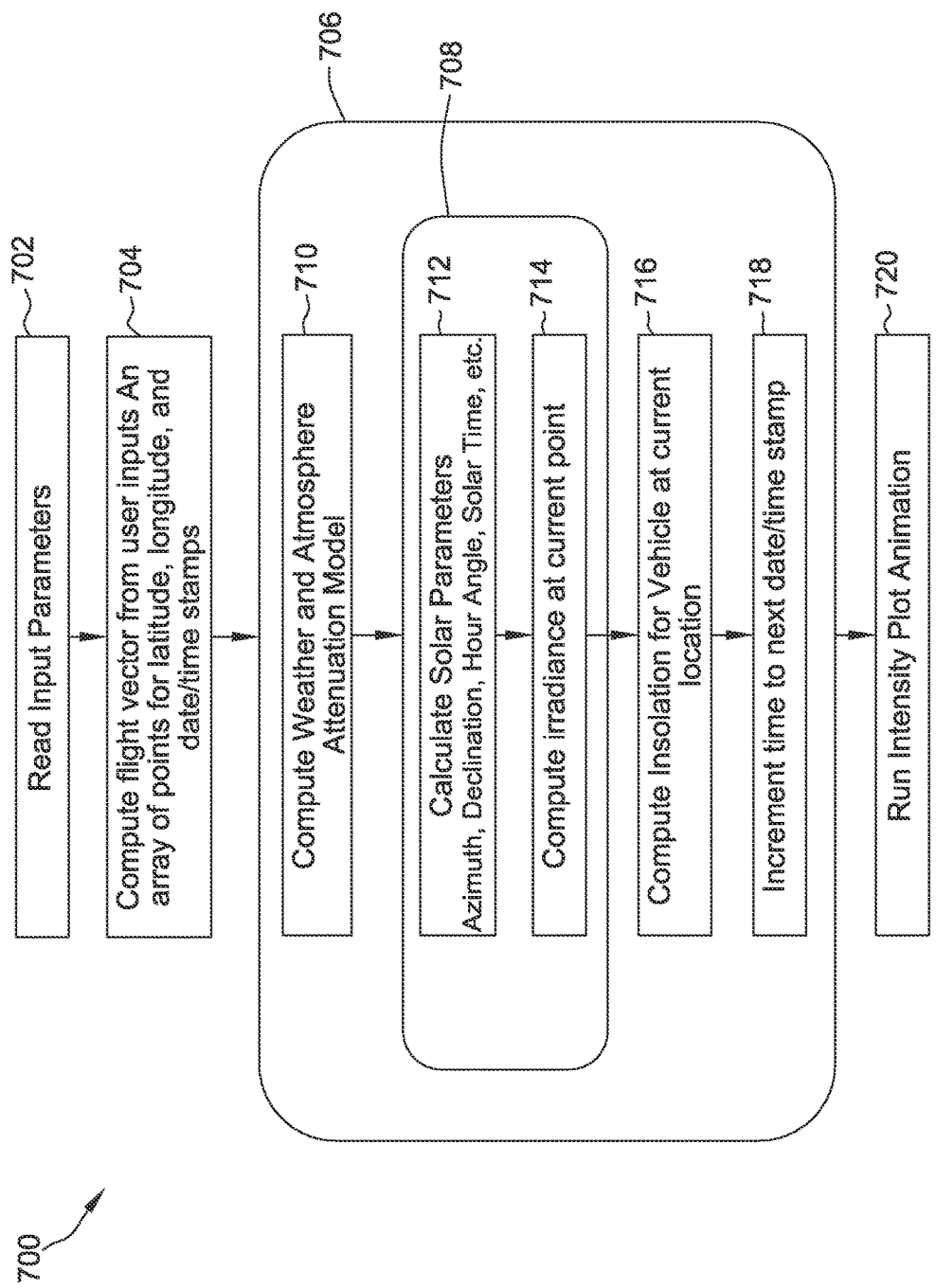
FIG. 7 is a flow chart of a process that may be performed by the computing device of FIG. 3 for predicting electrical energy production of the photovoltaic system of FIG. 2.

FIG. 7 is a flow chart of a process 700 that may be performed by computing device 300 for predicting electrical energy production of photovoltaic system 200 while aircraft 110 travels along flight path 112. Initially, computing device 300 reads 702 or receives input parameters, such as flight profile parameters 402 and model 404. Additionally, computing device 300 computes 704 a flight vector (flight path 112) based on the input parameters (e.g., flight profile parameters 402 and model 404). Flight path 112 includes a plurality of geographical points 104 each associated with a latitude, a longitude, and a date/time stamp. In some implementations, computing device 300 calculates Haversine distance and position vectors using estimated or predicted aircraft speeds from model 404. Next, in an outer loop 706 that computing device 300 executes for each time interval or intensity map 500, 502, 504, computing device 300 computes 710 (i.e., calculates or determines) a weather and atmosphere attenuation model (e.g., weather and atmosphere attenuation model 416). For relatively lower altitudes (i.e., below clouds), computing device 300 utilizes weather data 412 and 414, for example from weather database 410, to generate a model (e.g., weather and atmosphere attenuation model 416) for clarity conditions and diffuse light. In some implementations, computing device 300 uses probability generating function 418 to generate weather and atmosphere attenuation model 416. In other implementations, computing device 300 averages historical weather data 412 to generate weather and atmosphere attenuation model 416.

In inner loop 708, which computing device 300 executes for each geographical point 104, computing device 300 calculates 712 solar parameters including an azimuth, a declination, an hour angle, and a solar time. Additionally, computing device 300 computes 714 an irradiance or amount of solar irradiance 106 received at the geographical point 104 in view of weather and atmosphere attenuation model 416 and the solar parameters. In some implementations, computing device 300 computes an amount of solar irradiance received at a horizontal plane (not shown) associated with geographical point 104. While a certain set of solar parameters may indicate that a first amount of solar irradiance 106 will be received at geographical point 104, when computing device 300 applies weather and atmosphere attenuation model 416, the amount of solar irradiance 106, may be reduced to a second amount, for example, due to clouds located at or above geographical point 104.

Returning to outer loop 706, computing device 300 computes 716 an amount of solar irradiance 106 predicted to be received by aircraft 110 at its predicted location along flight path 112, and an estimated or predicted amount of electrical energy produced by photovoltaic system 200, for example by using Equation 1, described above. Next, computing device 300 increments 718 to a subsequent time interval (i.e., a date and time stamp) in the predetermined time period (i.e., the time period spanning the starting time and the predicted ending time associated with flight path 112). Accordingly, with each iteration of outer loop 706, computing device 300 generates a complete intensity map 500, 502, 504. After completing outer loop 706, computing device 300 runs 720 (e.g., displays or otherwise outputs) an intensity plot animation, for example a chronological sequence of first intensity map 500, at least one intermediate intensity map 502, and final intensity map 504, such as shown in FIG. 6.

Figure 8:
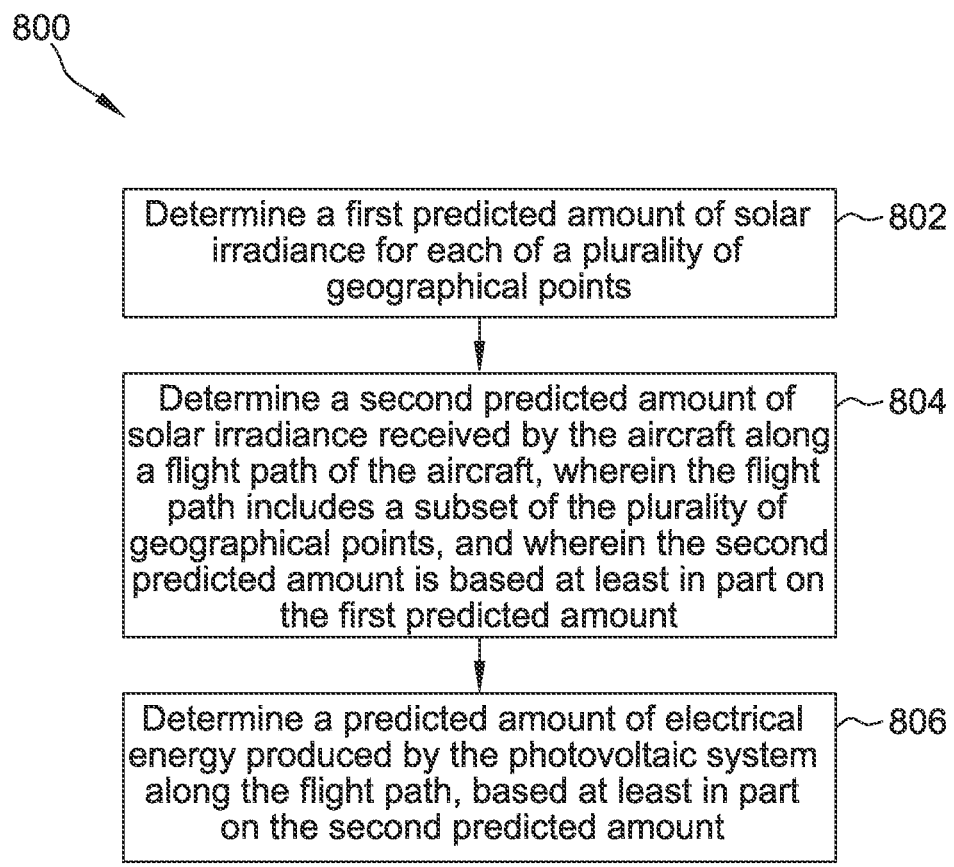
FIG. 8 is another flow chart of a process that may be performed by computing device of FIG. 3 for predicting electrical energy production of the photovoltaic system of FIG. 2.

FIG. 8 is another flow chart of a process 800 that may be performed by computing device 300 for predicting electrical energy production of a photovoltaic system, such as photovoltaic system 200 included in an aircraft, for example aircraft 110. Initially, computing device 300 determines 802 a first predicted amount of solar irradiance for each of a plurality of geographical points 104. Additionally, computing device 300 determines 804 a second predicted amount of solar irradiance 106 received by aircraft 110 along flight path 112 of aircraft 110, wherein flight path 112 includes a subset of the plurality of geographical points 104, and wherein the second predicted amount is based at least in part on the first predicted amount. Additionally, computing device 300 determines 806 a predicted amount of electrical energy produced by photovoltaic system 200 along flight path 112, based at least in part on the second predicted amount. In some implementations, the photovoltaic system is in another type of vehicle, other than an aircraft (e.g., an automobile) and the geographical points are included in a path taken by the vehicle, rather than specifically a flight path.

In some implementations, computing device 300 generates an animation (e.g., time series simulation 426) of solar irradiance 106 over flight path 112. In some implementations, computing device 300 generates an animation (e.g., time series simulation 426) of solar irradiance 106 over the Earth (i.e., planet 101) from a beginning time of the flight path (i.e., departure time) to an ending time of flight path 112. In some implementations, computing device 300 determines the second predicted amount based at least in part on a total surface area of photovoltaic system 200 (i.e., the sum of first surface area 212, second surface area 214, third surface area 216, fourth surface area 218, and fifth surface area 220). In some implementations, computing device 300 determines the predicted amount of electrical energy based at least in part on a system efficiency of the photovoltaic system, for example as described with reference to Equation 1. In some implementations, computing device 300 determines the second predicted amount based at least in part on a model (e.g., model 404) of aircraft 110, wherein model 404 defines at least one of surface angles and surface areas (i.e., aircraft geometry 406). In some implementations, computing device 300 determines the second predicted amount based at least in part on a model (e.g., model 404) of aircraft 110, wherein model 404 defines at least one of a cruise speed, a cruise altitude, and a takeoff speed (i.e., aircraft parameters 408). In some implementations, computing device 300 determines flight path 112 of aircraft 110 based at least in part on starting coordinates, ending coordinates, a departure time, a mean taxi time, and a mean gate time (i.e., flight profile parameters 402). In some implementations, computing device 300 may calculate electrical energy production for multiple flight paths and different aircraft models. Additionally, in some implementations, an analysis of electrical energy production can be filtered by airline, aircraft type, and/or other criteria. In some implementations, computing device 300 translates a net amount of electrical energy produced by photovoltaic system 200 into an estimated fuel savings, expressed, for example in pounds of fuel or money. In some implementations, computing device 300 estimates extraterrestrial irradiance for altitudes above the atmosphere and determines that the attenuation is zero.

A technical effect of systems and methods described herein includes at least one of: (a) determining a first predicted amount of solar irradiance for each of a plurality of geographical points; (b) determining a second predicted amount of solar irradiance received by at least one aircraft along a flight path of the at least one aircraft, wherein the flight path includes a subset of the plurality of geographical points, and wherein the second predicted amount is based at least in part on the first predicted amount; and (c) determining a predicted amount of electrical energy produced by a photovoltaic system of the at least one aircraft, along the flight path, based at least in part on the second predicted amount.

As compared to known methods and systems for predicting an amount of electrical energy produced by a photovoltaic system, the methods and systems described herein facilitate predicting an amount electrical energy that will be produced by a photovoltaic system of an aircraft as the aircraft travels along a flight path at a relatively high speed and through a range of altitudes.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for predicting electrical energy production of a photovoltaic system included in at least one aircraft, said method comprising:

determining a first predicted amount of solar irradiance for each of a plurality of geographical points;

generating an intensity plot of solar irradiance for each of the plurality of geographical points, including the first predicted amount of solar irradiance for each of the plurality of geographical points;

generating an intensity map of solar irradiance for a geographic area comprising the plurality of geographic points and based on the plurality of intensity plots;

generating an animation of the solar irradiance over a flight path based on the plurality of intensity plots for the plurality of geographical points and the intensity map;

determining a second predicted amount of solar irradiance received by the at least one aircraft along the flight path of the at least one aircraft, wherein the flight path includes a subset of the plurality of geographical points, and wherein the second predicted amount is based at least in part on the first predicted amount; and determining a predicted amount of electrical energy produced by the photovoltaic system along the flight path, based at least in part on the second predicted amount.

2. The method of claim 1, wherein generating an animation further comprises generating an animation of the solar irradiance over the Earth from a beginning time associated with the flight path to an ending time associated with the flight path based on the plurality of intensity plots for the plurality of geographical points.

3. The method of claim 1, wherein determining the second predicted amount further comprises determining the second predicted amount based at least in part on a total surface area of the photovoltaic system.

4. The method of claim 1, wherein determining the predicted amount of electrical energy further comprises determining the predicted amount of electrical energy based at least in part on a system efficiency of the photovoltaic system.

5. The method of claim 1, wherein determining the second predicted amount further comprises determining the second predicted amount based at least in part on a model of the at least one aircraft, wherein the model defines at least one of surface angles and surface areas.

6. The method of claim 1, wherein determining the second predicted amount further comprises determining the second predicted amount based at least in part on a model of the at least one aircraft, wherein the model defines at least one of a cruise speed, a cruise altitude, and a takeoff speed.

7. The method of claim 1, further comprising determining the flight path of the at least one aircraft based at least in part on starting coordinates, ending coordinates, a departure time, a mean taxi time, and a mean gate time.

8. A computing device for predicting electrical energy production of a photovoltaic system included in an aircraft, said computing device configured to:

determine a first predicted amount of solar irradiance for each of a plurality of geographical points;

generate an intensity plot of solar irradiance for each of the plurality of geographical points, including the first predicted amount of solar irradiance for each of the plurality of geographical points;

generate an intensity map of solar irradiance for a geographic area comprising the plurality of geographic points and based on the plurality of intensity plots;

generate an animation of the solar irradiance over a flight path based on the plurality of intensity plots for the plurality of geographical points and the intensity map;

determine a second predicted amount of solar irradiance received by the aircraft along the flight path of the aircraft, wherein the flight path includes a subset of the plurality of geographical points, and wherein the second predicted amount is based at least in part on the first predicted amount; and determine a predicted amount of electrical energy produced by the photovoltaic system along the flight path, based at least in part on the second predicted amount.

9. The computing device of claim 8, further configured to generate an animation of the solar irradiance over the Earth from a beginning time associated with the flight path to an ending time associated with the flight path based on the plurality of intensity plots for the plurality of geographical points.

10. The computing device of claim 8, further configured such that determining the second predicted amount further comprises determining the second predicted amount based at least in part on a total surface area of the photovoltaic system.

11. The computing device of claim 8, further configured such that determining the predicted amount of electrical energy further comprises determining the predicted amount of electrical energy based at least in part on a system efficiency of the photovoltaic system.

12. The computing device of claim 8, further configured such that determining the second predicted amount further comprises determining the second predicted amount based at least in part on a model of the aircraft, wherein the model defines at least one of surface angles and surface areas.

13. The computing device of claim 8, further configured such that determining the second predicted amount further comprises determining the second predicted amount based at least in part on a model of the aircraft, wherein the model defines at least one of a cruise speed, a cruise altitude, and a takeoff speed.

14. The computing device of claim 8, further configured to determine the flight path of the aircraft based at least in part on starting coordinates, ending coordinates, a departure time, a mean taxi time, and a mean gate time.

15. A non-transitory computer-readable storage medium having computer-executable instructions embodied thereon for predicting electrical energy production of a photovoltaic system included in an aircraft, wherein when executed by a computing device having at least one processor, the computer-executable instructions cause the computing device to:

determine a first predicted amount of solar irradiance for each of a plurality of geographical points;

generate an intensity plot of solar irradiance for each of the plurality of geographical points, including the first predicted amount of solar irradiance for each of the plurality of geographical points;

generate an intensity map of solar irradiance for a geographic area comprising the plurality of geographic points and based on the plurality of intensity plots;

generate an animation of the solar irradiance over a flight path based on the plurality of intensity plots for the plurality of geographical points and the intensity map;

determine a second predicted amount of solar irradiance received by the aircraft along the flight path of the aircraft, wherein the flight path includes a subset of the plurality of geographical points, and wherein the second predicted amount is based at least in part on the first predicted amount; and determine a predicted amount of electrical energy produced by the photovoltaic system along the flight path, based at least in part on the second predicted amount.

16. The non-transitory computer-readable storage medium of claim 15, wherein said computer-executable instructions further cause the computing device to generate an animation of the solar irradiance over the Earth from a beginning time associated with the flight path to an ending time associated with the flight path based on the plurality of intensity plots for the plurality of geographical points.

17. The non-transitory computer-readable storage medium of claim 15, wherein said computer-executable instructions further cause the computing device to determine the second predicted amount based at least in part on a total surface area of the photovoltaic system.

18. A method for predicting electrical energy production of a photovoltaic system included in at least one vehicle, said method comprising:

determining a first predicted amount of solar irradiance for each of a plurality of geographical points;

generating an intensity plot of solar irradiance for each of the plurality of geographical points, including the first predicted amount of solar irradiance for each of the plurality of geographical points;

generating an intensity map of solar irradiance for a geographic area comprising the plurality of geographic points and based on the plurality of intensity plots;

generating an animation of the solar irradiance over a flight path based on the plurality of intensity plots for the plurality of geographical points and the intensity map;

determining a second predicted amount of solar irradiance received by the at least one vehicle along the flight path of the at least one vehicle, wherein the flight path includes a subset of the plurality of geographical points, and wherein the second predicted amount is based at least in part on the first predicted amount; and determining a predicted amount of electrical energy produced by the photovoltaic system along the flight path, based at least in part on the second predicted amount.

19. A computing device for predicting electrical energy production of a photovoltaic system included in a vehicle, said computing device configured to:

determine a first predicted amount of solar irradiance for each of a plurality of geographical points;

generate an intensity plot of solar irradiance for each of the plurality of geographical points, including the first predicted amount of solar irradiance for each of the plurality of geographical points;

generate an intensity map of solar irradiance for a geographic area comprising the plurality of geographic points and based on the plurality of intensity plots;

generate an animation of the solar irradiance over a flight path based on the plurality of intensity plots for the plurality of geographical points and the intensity map;

determine a second predicted amount of solar irradiance received by the vehicle along the flight path of the vehicle, wherein the flight path includes a subset of the plurality of geographical points, and wherein the second predicted amount is based at least in part on the first predicted amount; and determine a predicted amount of electrical energy produced by the photovoltaic system along the flight path, based at least in part on the second predicted amount.

20. A non-transitory computer-readable storage medium having computer-executable instructions embodied thereon for predicting electrical energy production of a photovoltaic system included in a vehicle, wherein when executed by a computing device having at least one processor, the computer-executable instructions cause the computing device to:

determine a first predicted amount of solar irradiance for each of a plurality of geographical points;

generate an intensity plot of solar irradiance for each of the plurality of geographical points, including the first predicted amount of solar irradiance for each of the plurality of geographical points;
generate an intensity map of solar irradiance for a geographic area comprising the plurality of geographic points and based on the plurality of intensity plots;
generate an animation of the solar irradiance over a flight path based on the plurality of intensity plots for the plurality of geographical points and the intensity map;
determine a second predicted amount of solar irradiance received by the vehicle along the flight path of the vehicle, wherein the flight path includes a subset of the plurality of geographical points, and wherein the second predicted amount is based at least in part on the first predicted amount; and
determine a predicted amount of electrical energy produced by the photovoltaic system along the flight path, based at least in part on the second predicted amount.

* * * * *